United States Patent [19]

Nelson

[11] Patent Number: 4,838,968
[45] Date of Patent: Jun. 13, 1989

[54] APPARATUS AND METHOD FOR MAKING V-GROOVE INSULATION

[76] Inventor: Charles M. Nelson, 6303 Brookhill Dr., Houston, Tex. 77087

[21] Appl. No.: 119,821

[22] Filed: Nov. 12, 1987

[51] Int. Cl.⁴ ............................................. B32B 31/18
[52] U.S. Cl. ....................................... 156/64; 83/176;
  156/220; 156/268; 156/378; 156/516; 156/526;
  156/575; 428/167
[58] Field of Search .................... 83/176, 875; 156/64,
  156/220, 268, 378, 516, 523, 526, 575; 428/167

[56] References Cited

U.S. PATENT DOCUMENTS

| | | |
|---|---|---|
| 176,892 | 5/1876 | Rollins . |
| 698,006 | 4/1902 | Gerrish . |
| 1,940,106 | 12/1933 | Snyder . |
| 2,335,767 | 11/1943 | Kinports . |
| 2,344,003 | 3/1944 | Sheptinsky . |
| 2,455,097 | 11/1948 | Scianna . |
| 2,735,426 | 2/1956 | Claydon ........................ 156/268 X |
| 2,747,280 | 5/1956 | Kurata . |
| 3,534,646 | 10/1970 | Tyer, Jr. . |
| 3,595,287 | 7/1971 | Indermark . |
| 3,610,079 | 10/1969 | Ashby . |
| 3,672,415 | 6/1972 | Holan . |
| 3,690,356 | 9/1972 | Holan . |
| 3,706,251 | 12/1972 | Wheeler et al. . |
| 3,730,031 | 5/1973 | Huttemann ..................... 83/176 X |
| 3,820,233 | 6/1974 | Baker . |
| 3,821,915 | 7/1974 | Larrable . |
| 3,910,170 | 10/1975 | Boy . |
| 3,915,038 | 10/1975 | Malin . |
| 3,969,868 | 7/1976 | Bainter et al. .................. 428/167 X |
| 3,986,419 | 10/1976 | Cleghorn . |
| 4,054,165 | 10/1977 | Karakawa . |
| 4,139,669 | 2/1979 | Chang ............................. 428/167 |
| 4,208,934 | 6/1980 | Wall . |
| 4,224,854 | 9/1980 | Malacheski et al. . |
| 4,234,657 | 11/1980 | Bussey .......................... 428/167 X |
| 4,409,875 | 10/1983 | Nakajima et al. . |
| 4,411,183 | 10/1983 | Auer . |
| 4,599,925 | 7/1986 | Rom . |
| 4,608,902 | 9/1986 | Ivey ................................... 83/875 |

FOREIGN PATENT DOCUMENTS 1905315 8/1970 Fed. Rep. of Germany .

*Primary Examiner*—Robert A. Dawson
*Attorney, Agent, or Firm*—Arnold, White & Durkee

[57] ABSTRACT

An improved method and apparatus for making V-groove insulation is disclosed. More particularly, the device of the present invention relates to an endless track fabrication and cutting system whereby prefabricated, sectioned lengths of insulation material are formed into continuously grooved insulation sheets of readily variable dimensions.

22 Claims, 5 Drawing Sheets

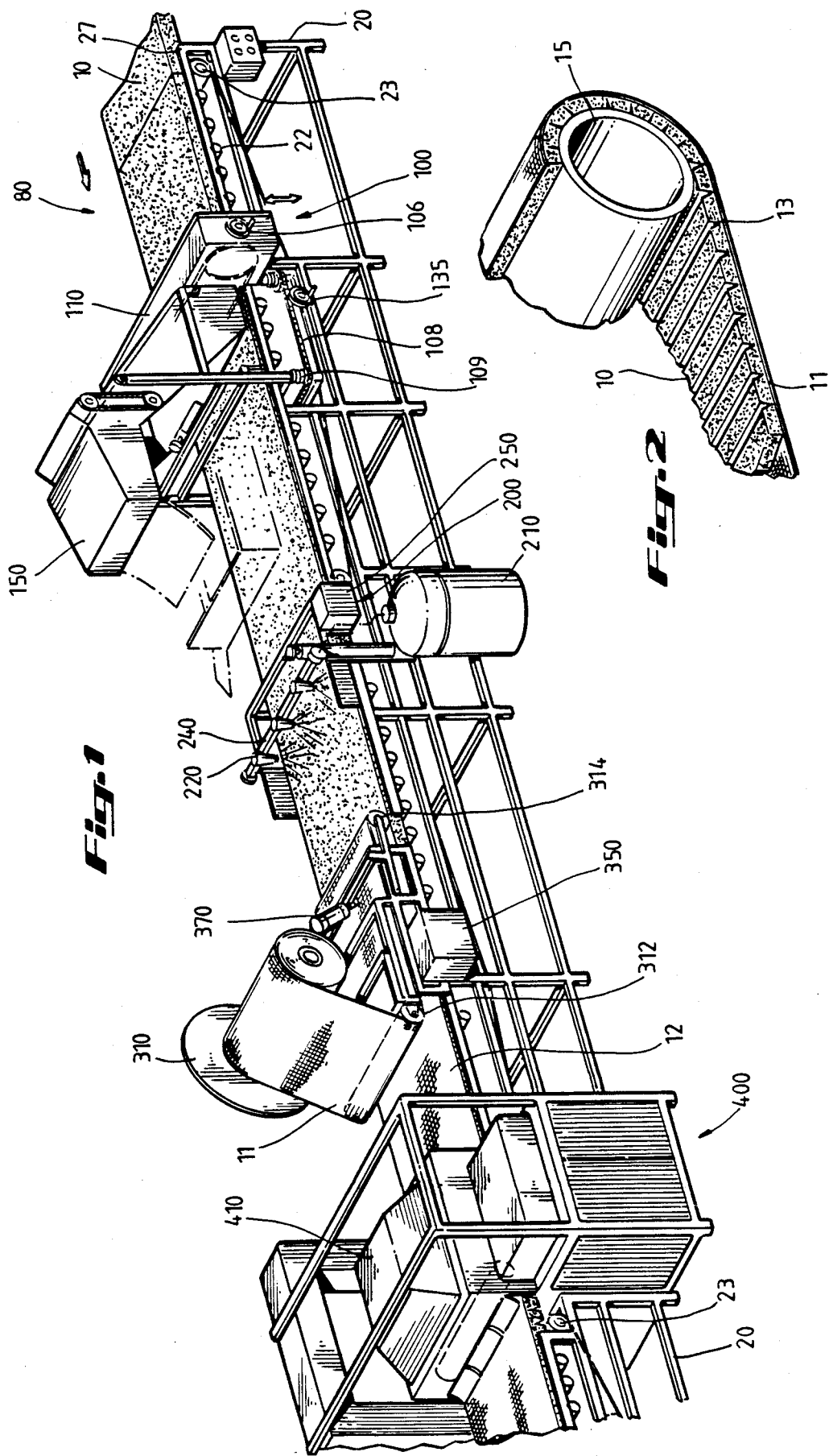

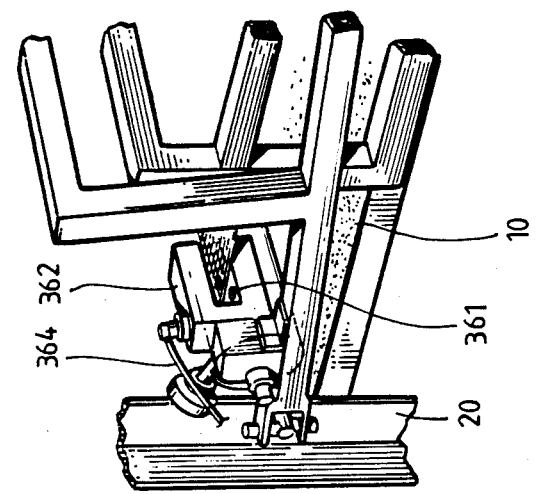
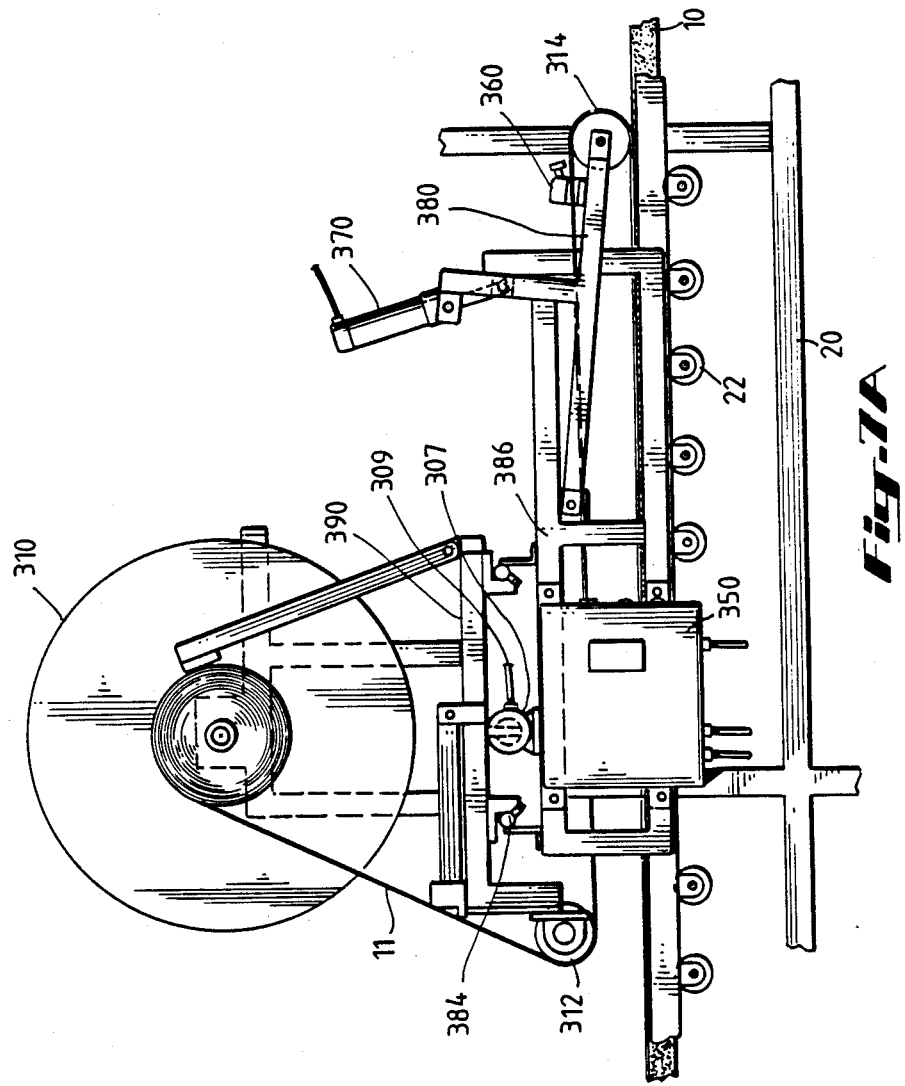

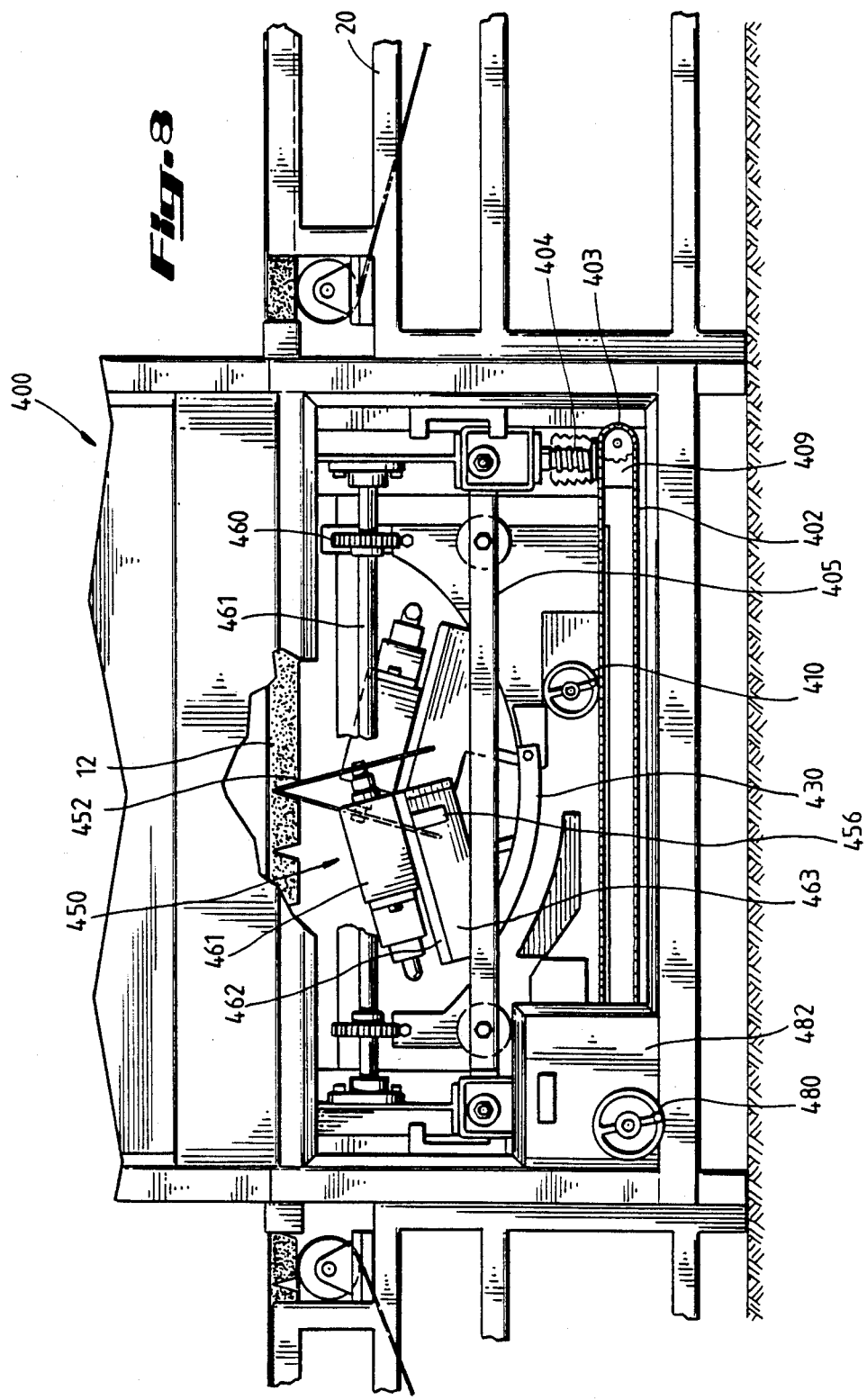

APPARATUS AND METHOD FOR MAKING V-GROOVE INSULATION

BACKGROUND OF THE INVENTION

1. Field of the Invention

The present invention relates generally to a method and apparatus for making V-groove insulation. More particularly, the present invention relates to an endless track fabrication and cutting system whereby prefabricated, sectional lengths of an insulation material are formed into continuous, grooved insulation sheets of variable dimensions.

2. Description of the Prior Art

In recent years, considerable advancements have been made in reducing radiative energy loss through the expansive use of a variety of insulation materials. In many commercial and industrial applications, such insulation materials are applied to the exterior of heat carrying members such as piping or ductwork. Further, this insulation may be applied in a variety of fashions depending on the insulating effect required in a given application. In contemprary applications, two common insulation techniques include spray-on insulation and preformed insulation specially adapted to be fitted and secured around a particular sized thermal member.

Several disadvantages are associated with both of these insulation techniques. Once hardened on the pipe or duct work, spray-on insulation material generally does not allow for ready access to the heat carrying member, thus hindering its inspection and/or repair. Further, spray-on insulation often does not evenly adhere or bond to the heat bearing member, thus creating "hot" or "cold" spots. Spray-on type insulation can also trap salt bearing or corrosive fluids which result in eventual deterioration of the thermal member. Spray-on type insulation is also very sensitive to local environmental conditions, and is therefore successfully applied only within rigid wind, temperature and humidity parameters. Finally, spray-on insulation is messy in application and often aesthetically unappealing.

Disadvantages associated with preformed insulation techniques include the overall cost to individually form or mold a given insulation section to its intended application around the thermal member. For a given length and diameter pipe or duct, a specific dimension insulating section must be formed, this process often time and energy intensive. Preformed insulation sections are also expensive from the standpoint of both storage and shipment. Further, preformed sections are not easily adapted to other applications and often poorly fit their original, intended application due to manufacturing tolerances.

As a result of these and other disadvantages, other contemporary insulation systems have evolved which utilize a flat section of insulation which has been notched or grooved to accommodate a gven diameter circular pipe or duct. In utilizing such a grooved insulation system, a flat section of insulation may be wrapped around a pipe or circular duct such as to maintain an insulation coating of uniform thickness. The insulation is held in place by an appropriately sized band or jacket. When repair or inspection of the thermal member is required, the band or jacket is released and the insulation section may be readily removed.

The notched or grooved systems, however, while less expensive than the molded systems and more manageable than the spray-on systems, have still not been readily and inexpensively adaptable to the variety of pipe diameters and lengths found in actual commercial application. This deficiency has arisen as a result of the failure of the art to develop a high speed precision system capable of consistently forming a series of clean, V-grooves or notches in the insulation material while the material moves in an assembly-line like fashion. This failure has resulted in uneven notch or groove dimensions and, consequentially, uneven and often unacceptable performance in wrapped applications. Further, such systems have been unable to accurately and uniformly establish a desired thickness in the insulation sheet, thus further hindering its application around tubular piping and the like. Thus, while V-groove insulation has been less expensive to fabricate than preformed insulation, its performance and flexibility in actual application has been often less than satisfactory.

Prior art notching or grooving systems have also been hindered by the undesired and physically harmful formation of insulation dust caused by the notching or grooving process. In such processes, therefore, elaborate dust removal systems have been employed, thus increasing the overall size and cost of these systems.

Finally, most prior art systems have been unable to economically produce small scale custom or tailored applications due to the cost of modifying a given tool or mold. Thus, economical insulation sections or products were often limited to relatively large projects.

SUMMARY OF THE INVENTION

The present invention addresses the above noted and other disadvantages by providing a rapid, efficient, yet inexpensive method and apparatus for forming variable dimension sections of V-groove insulation adapted to form a compression fit around a given thermal member.

In a preferred embodiment of the invention, prefabricated, sectional lengths of insulation material, preferably mineral wool insulation material, are placed end to end on an endless track conveyer system. The thickness of these lengths is then modified or "planed" commensurate with the particular insulation requirements for a given commission. This is preferably achieved by a band saw assembly disposed laterally across the conveyor track. After the sections of insulation are thus prepared to a desired thickness, a quick drying contact adhesive is evenly applied to the upper side of the insulation section. This adhesive secures a continuous length of a backing material to the sections. This backing material securely, yet flexibly holds the insulation sections in their abutted end-to-end relationship so as to form a continuous integral sheet. This integral sheet is then passed over a cutting and grooving assembly situated below the conveyer system, where a series of grooves or notches are formed in its lower surface. At the completion of the grooving process, the integral sheet may be cut into prescribed lengths.

The above described process is preferably controlled via a microprocessor assembly. Thus the various and individual steps of planing, gluing, cutting, etc., are preferably coordinated so as to produce a constant flow of prescription length V-groove insulation material at the terminal, output end of the system.

In a preferred aspect, the present invention includes the design of the V-groove cutting assembly. In a preferred embodiment, the cutting assembly includes hydraulic circular saw assemblies positioned along a relatively movable accurate track in an offset relationship.

In such a fashion, the grooving saws may be accurately positioned and adjusted to provide the angle or depth of the groove desired in the finished insulation product.

The present invention offers a number of advantages over the prior art. One such advantage is the ability of the present invention to economically produce selected quantities of a prescription-sized V-grooved insulation, where the final insulation product is characterized by a series of consistently clean cut grooves or notches.

The present invention also offers the ability to quickly and precisely adjust the angle and depth at which a V-groove is cut in an insulation sheet, such that the final insulation product will maintain a precision compression fit over the pipe or duct to be insulated. In a preferred aspect, the present invention provides a continuous fabrication and cutting process without a heavy generation of insulation dust.

Yet another advantage of the present invention is the ability to closely control, regulate and modify the angulation and depth of V-grooves cut in the insulation sections, in addition to precisely controlling the spacing of these grooves.

BRIEF DESCRIPTION OF THE DRAWINGS

FIG. 1 is a perspective view of a preferred embodiment of the present invention.

FIG. 2 is a perspective view of the finished end product of the present invention as it may be wrapped around a thermal member.

FIG. 7A is a side view of the backing means as it may be situated relative to the conveyor track.

FIG. 7B is a detailed view of the automatic alignment assembly of the backing means.

FIG. 8 is a side cut-away view of the cutting and grooving means.

DESCRIPTION OF THE PREFERRED EMBODIMENT

Figure 3:
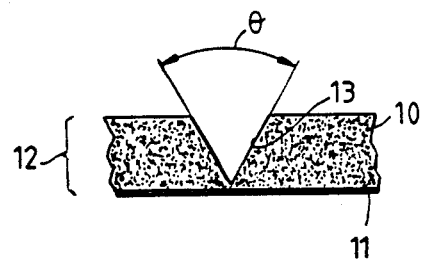
FIG. 3 is a side view of an aggregate insulation piece illustrating a V-cut groove or notch.

As illustrated in FIG. 1, the present invention is preferably comprised of a number of specialized assemblies or "stations", each disposed along, above or proximate to an endless track conveyor system. The conveyor system itself is generally comprised of an upright tubular frame 20 along the top of which are secured a plurality of rollers 22 or the like to form a bed 27. Flexibly disposed over these rollers 22 is a conventional looped belt arrangement (not shown) driven by a motor through guide rollers 23 such that the material placed atop the system may be moved longitudinally down the frame 20 for further processing as shown by direction arrow A. The travel rate of the conveyor system is governed by a microprocessor system, which, as will be later described, also governs the placement and frequency with which V-grooves are cut in a given insulation section 10.

The components and operation of the present system may be described as follows. Beginning from the upstream end of the conveyor assembly, insulation sections 10 of a given, manufactured dimension, generally 1"–4" thick, are first placed on a loading area 80 where they are joined together with an adhesive in an end-to-end abutting relationship to form a continuous sheet. This continuous sheet is then automatically moved toward a planing means 100 along frame 20.

Figure 4:
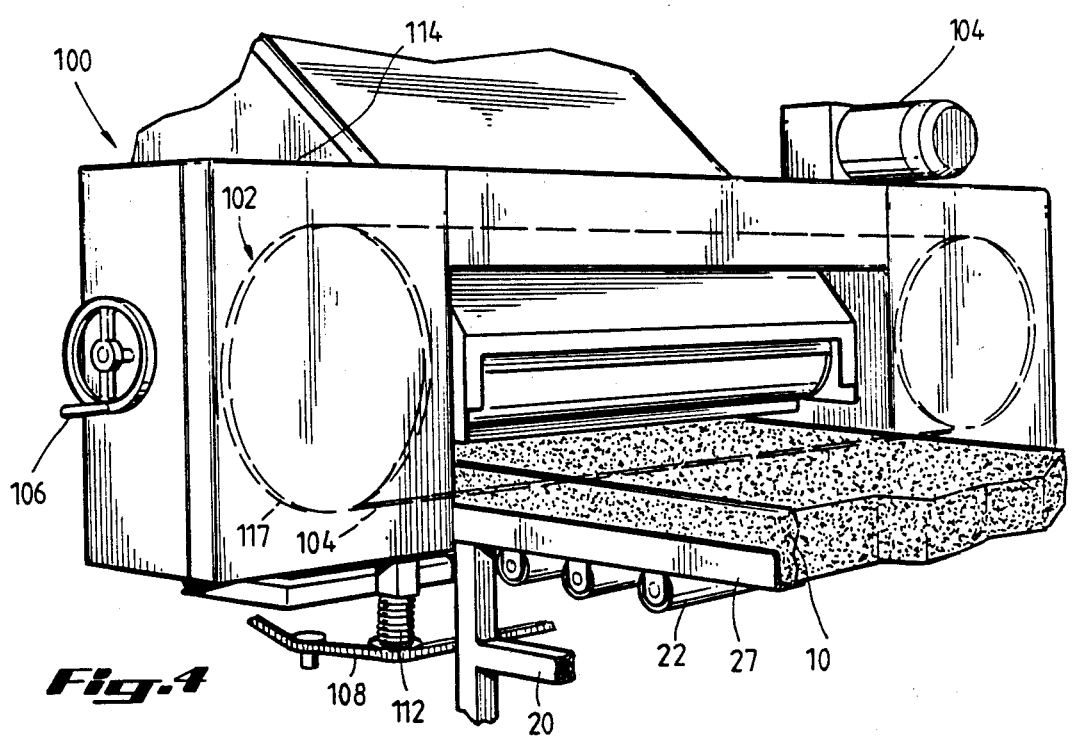
FIG. 4 is a perspective view of the planing means.
Figure 5:
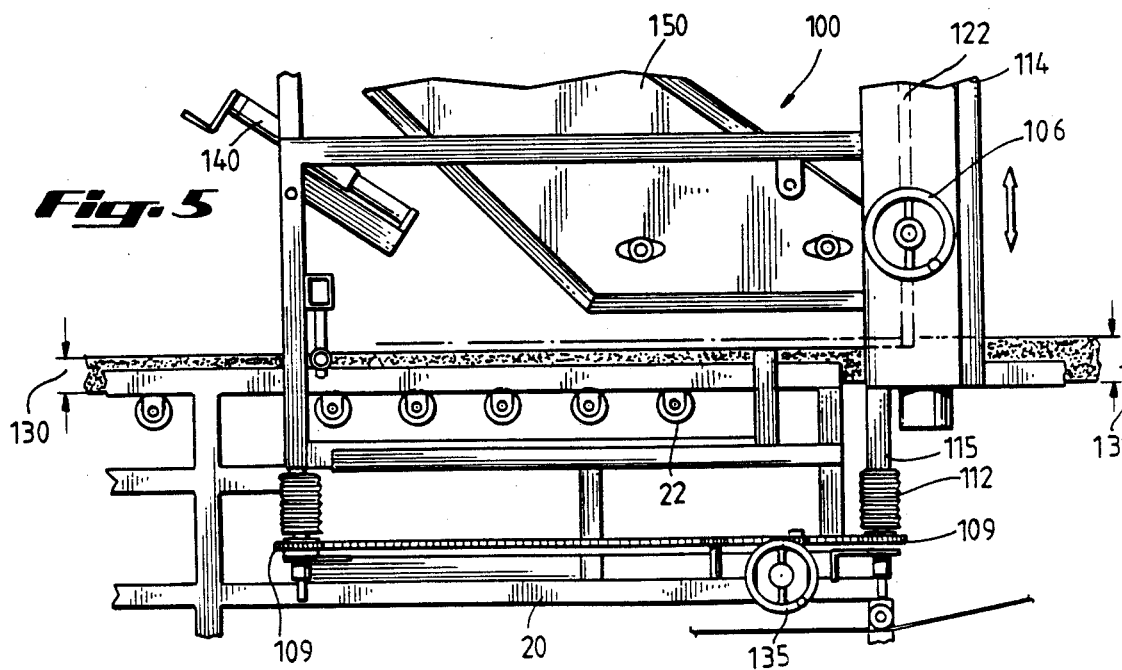
FIG. 5 is a side view of the planing means.

Specifically referring to FIGS. 4–5, the planing means 100 is preferably comprised of a housing 114 situated above and connected to the frame 20. A band saw assembly 102 is laterally disposed in the housing 114 at a variable height above the frame bed 27 such that the saw blade 104 contacts the leading edge of a given insulation section 10 as it moves downstream. This blade 104 is preferably disposed at a uniform height along its length above the bed 27 such as to establish a uniform and prescribed thickness in the section 10. The planing or cutting operation of assembly 100 is carried out while insulation sections 10 move downstream toward the next station.

In a preferred embodiment, the planing means 100 utilizes a conventional band saw having 20" diameter drive wheels 117 around which is secured a 6 pitch ¾" precision blade 114. Drive wheels 117 are driven by a 2 horsepower 220 single phase electric motor (not shown) such that the blade 114 achieves an average operation speed of 1720 RPM. Tension in blade 114 may be modified via handwheel 106.

The vertical position of the saw blade 104 relative the bed 27 may be varied by manual movement of adjustment wheel 135. Wheel 135 is connected to height adjustment chain 108, such that movement of wheel 135 causes chain 108 to move in a longitudinal fashion about sprockets 109, which in turn are connected to adjustment supports 112 secured to frame 20. Supports 112 in turn, threadedly engage housing supports 115 via a pinion or linear gear arrangement such that rotation of sprockets 109 results in a vertical movement of supports 115 relative to the frame 20. Hence, by movement of hand wheel 135 the housing 114 may be uniformly raised or lowered relative to the bed 27 so as to establish a desired thickness 130 in an insulation section 10 having a manufactured thickness 131.

In a preferred embodiment, the planing assembly 110 is provided with an exhaust or vacuum system to remove dust and small insulation particulates generated as a result of the planing process. This system generally includes a conventional exhaust and ventilation system situated inside the housing 114 and operative via vacuum line 122. Due to the construction of housing 114, and the minimal agitation action of saw assembly 102, dust and particle generation are both minimized and contained with any generation being removed to an external collection bin or reservoir (not shown).

A material removal system 150 may also be attached to the housing 114 downstream from the saw assembly 102 itself such that the upper, undesired portion of insulation material planed from the main insulation section 10 may be removed for disposal via a conveyor or other means. This removal system is powered by electric motor 104.

Figure 6A:
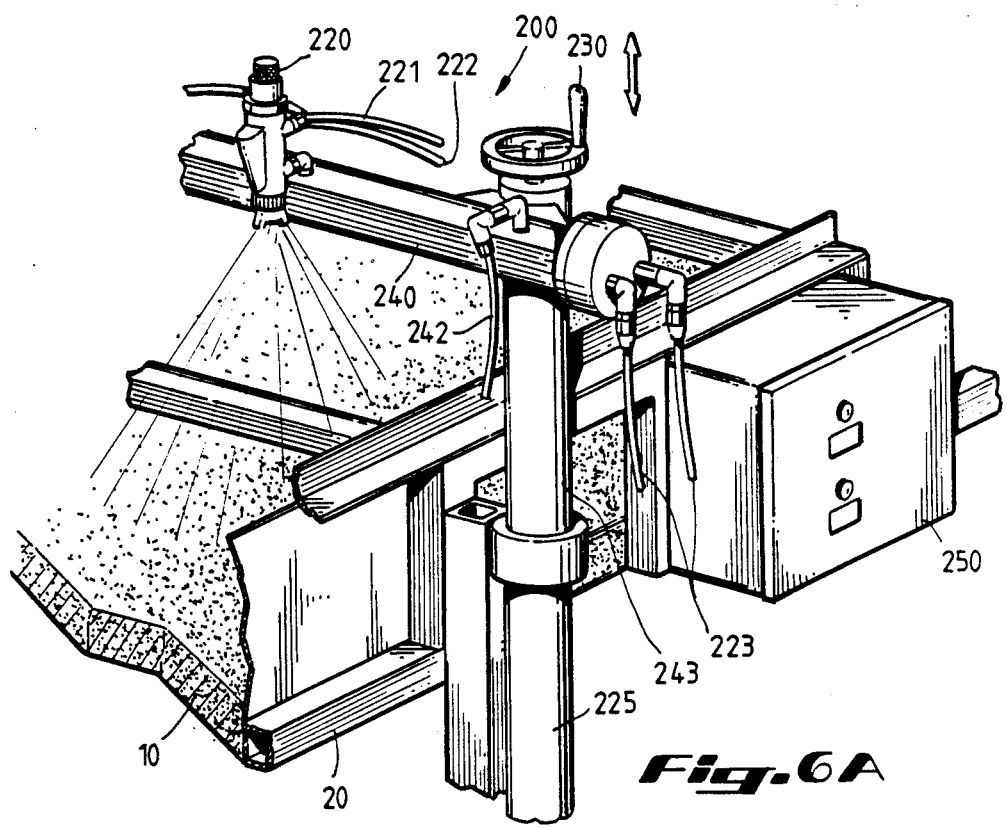
FIG. 6A is a perspective cut-away view of the spraying or gluing system.
Figure 6B:
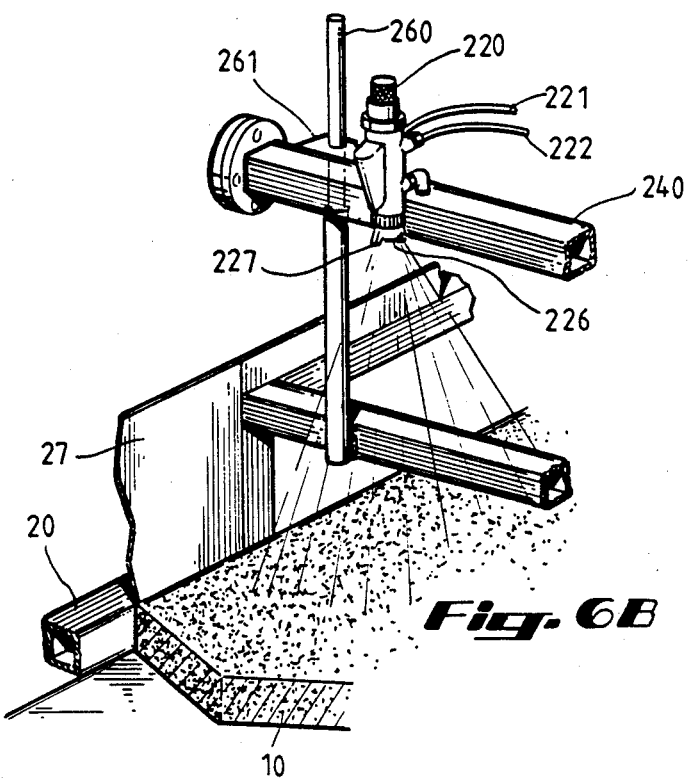
FIG. 6B is a detailed perspective view of the spraying system illustrating a spray nozzle.

When insulation sections have been planed to a desired thickness 130, the sections 10 are automatically conveyed downstream to a spraying assembly 200. Referring specifically to FIGS. 6A–B, the spraying assembly 200 is generally comprised of one or more upright supports 260 attached to the frame 20, said supports 260 slidably coupled to a support arm 240 via guide sleeves 261. As seen in FIG. 6A, in some embodiments one of these supports 260 may be replaced with a vertical adjustment assembly comprised of an upper member 243 disposed in a movable telescoping arrangement with lower member 225.

In the system 200, a series of spray nozzle assemblies 220, such as a Bink's series 2001 spray gun assembly, are fixedly secured to the support arm 240 such that adhesive material discharged through the nozzles may be evenly applied over an insulation section 10. In FIG. 6A, one or more connectors 242 connect the nozzle array 220 with a pressurized adhesive reservoir 210. (See. FIG. 1) A hydraulic connector line 223 is disposed through the support arm 240 in a looped arrangement to act as a heat source to prevent adhesive introduced into arm 240 from becoming too viscous during cold operation.

Also attached to nozzles 220 are a series of air connectors 221 and 222. Connector 221 is linked directly to nozzle 220 to provide an air flow onto the work surface through apertures 227 arranged at the periphery of nozzle tip 226. Liquid adhesive is pumped through the inner part of this nozzle tip 226, such that the combination air and adhesive flow results in a fan shaped propagation of adhesive over insulation section 10.

Connector 222 is used to provide a source of air gun to activate nozzle 220 during forward movement of the insulation section 10 upon an electric signal from the microprocessor. This electric signal is used to open a solenoid valve which then allows air pressure to trigger the spraying action of the nozzle 220. Solenoids and their related controls are contained in housing 250.

The exact distribution and concentration of the adhesive may be varied by altering the height of the support arm 240 and hence the nozzles 220 relative to the surface of the insulation section 10. This variable height may be adjusted by movement of handle 230 which operates as a screw jack to move upper member 243 vertically relative lower member 225.

Once an even distribution of a quick drying adhesive is applied to the upper surface of the planed insulation section 10, the section 10 may be further moved downstream to a backing means 300. The backing means 300 preferably includes a support frame 386 rigidly secured to and suspended above the frame 20. Slidably secured to the frame 386 about tracks 384 is a spool support structure 390 adapted to rotatably accommodate a spool 310 of a backing material 11. Rotatably attached at the rear, downstream extent of the support frame 386 is a first guide roller 312 which is of a size sufficient to accommodate backing 11 of variable widths. Hinged at the frontal extent of the support frame 386 is an application roller arm 380 which accommodates an application roller 314.

A pneumatic inducer 307 is disposed between support frame 386 and spool support structure 390. Inducer 307 is connected to an air supply via connector 309, and also to an electric eye guide means 360. Upon activation of inducer 307, spool support structure 390 may be urged in a lateral direction along rails 384.

The application roller arm 380 contacts the moving insulation material 10 through roller 314 at a pressure determined by pneumatic cylinder 370. This pressure may be modified by increasing or decreasing the air supply to said cylinder 370 by a valve (not shown).

In operation, the backing material 11 is paid off of the spool 310 where it is tensioned between rollers 312 and 314 and it then engages the prepared surface of the insulation section 10. In this fashion, a continuous length of backing material 11 is applied over the abutting sections 10 so as to form a continuous, integral sheet 12.

To avoid expensive and time consuming trimming operations, it is desired that the backing material 11 be exactly juxtaposed over the insulation material 10 before contact between the two surfaces is made. Due to inherent irregularities associated with different factory winding processes, however, not all backing materials will perform similarly in tensioned application, thus creating a series of wrinkles which may result in less than satisfactory adhesion of material 11 to insulation 10. Similarly, some backing materials may arrive from the factory "staggered" or unevenly wound on the roll. Due to these and other problems, therefore, an alignment apparatus is thus needed to ensure even distribution and alignment of the backing 11 on the insulation sheets 10.

In the present invention, this alignment is preferably accomplished electronically via an electric eye guide means 360 such as a model No. 57044H/H1116 electric eye and control component as available from Hydralign, Inc. Referring to FIGS. 7A-7B, the electric eye assembly 360 is situated on the upper portion of the application roller arm 380 such as to contact the edge of backing material 11 tensioned between rollers 312 and 314. The electric eye and receptor 361 itself is disposed within the inner extent of a U-shaped housing 362 such that backing 11 tensioned between rollers 312 and 314 passes through the housing 362. As described, the eye and receptor unit 361 is electrically coupled to inducer 307 thus resulting in a transverse adjustment of the spool frame 390 about tracks 384 so that precise alignment and fixation of the backing 11 to sections 10 may be automatically accomplished.

The backing material 11 itself is preferably comprised of a flexible Mylar TM or Kevlar TM composition such as a Hypolon ® TGH-100 laminate made by Alpha Associates, Inc. of Woodridge, N.J. or a foil scrim (FSK) or all service jacket (ASJ) as manufactured by LAMTEC Corp. of Flanders, N.J.

Once backing 11 has been affixed to abutting insulation section 10, the integral insulation sheet 12 is moved further downstream where it finally engages the cutting and grooving assembly 400. This assembly 400 is preferably comprised of two independent saw carriages slidably disposed beneath the bed 27 such that a variety of differently configured V-grooves may be quickly and precisely produced in the underside of the integral sheet 12.

In a preferred embodiment, two hydraulic circular saws 450 are fixedly positioned on arcuate tracks 430 in an offset relationship as shown. The combination circular saw 450 and track 430 forms a carriage which is transversely movable relative to the integral insulation sheet 12 by drive wheels 460 engaging drive chains (not shown). These drive wheels 460 are mounted on a drive shaft 461 which in turn translates the movement of a drive motor (not shown) to accomplish transverse movement of the carriage about the bed 27. Each saw carriage is transversely movable to an extent beyond the lateral perimeter of the frame 20 such as to allow the insulation sheet 12 to progress after a given groove 13 is cut. The actuation of drive shaft 461 and hence the transverse movement of the saw carriages is governed by a microprocessor assembly (not shown).

Since the saws 450 are offset as earlier described, both sides of a V-groove or notch 13 may be cut as the carriage moves transverse to the long axis of the frame 20.

V-grooves of the insulation material cut from the underside of the sheet 12 fall downwardly into a collection area of assembly 400 where they are removed to a continuous belt conveyor which transports them to a vacuum removal system (not shown).

Referring to FIGS. 2, 3, and 8 the design of the grooving apparatus 400 allows a variety of different depth and angulation V-grooves to be created in a given integral insulation section 12. This versatility is essential since for each diameter thermal member 15, a different aspect insulation piece must be generated.

A number of adjustments are possible. The frequency at which the grooves are formed in the underside of the integral sheet 12 is precisely controlled via a programmable microprocessor assembly (not shown). This assembly, is in turn, linked to the main drive motor of the conveyor system such as to regulate the rate at which the sheet of integral material 12 contacts cutting elements 452 of assembly 400.

The angulation of the V-groove 13 may be quickly modified by adjustment of the relative posture of arcuate tracks 430 on which are affixed saw assemblies 450. To adjust the angle of the V-groove, the operator manually rotates handle 410 which results in a relative and equal movement between each frame 430, such that each saw assembly 450 is inclined to an equal and measurable degree so as to result in the formation of an isosceles V-grooved being formed in the underside of the integral sheet 12.

For applications where a higher insulation coefficient is required, the insulation sheet 10 will normally be of a greater thickness. Ordinarily in such applications, a commensurate increase in V-groove depth will also be needed. This increased depth may be achieved by vertical adjustment of the subassembly 405 relative frame 20 and hence bed 27. This is accomplished by rotation of height adjustment handle which engages chain 402 and sprocket 403. As noted, subframe 405 threadedly engages gearbox 409 secured to frame 20, by a pinion or linear gear 404. Thus coupled, rotation of adjustment handle 480 results in a vertical movement of the subframe 430 relative the frame 2, thus varying the penetration of the saw blades 452 into the bottomside of the sheet 12.

The cutting and grooving operation 400 is also adapted to sever the integral sheet 12 into desired lengths commensurate with the given application. These lengths may be programmed into the microprocessor for automatic operation.

The cut is physically accomplished by saw assembly 450. Referring to FIG. 7A, saw assembly 450 is itself comprised of three component parts. The motor 461 is secured to a subframe 463 which itself is hingedly secured to a main frame 463, which as noted, is secured to track 430. Disposed inside of main frame 463 is a hydraulic cylinder 456 which is electrically connected to the microprocessor. This cylinder 466 is oriented for operation in a plane almost normal to the bed 27. When actuated, cylinder 466 moves upward against subframe 463 which pivots about hinge 469 moving saw motor 451 and accompanying blade 452 upward as to result in a complete severance of the sheet 12. Upon completion, cylinder 466 returns to its original position.

What is claimed is:

1. An apparatus for the fabrication of grooved lengths of a given insulation material from sectional lengths of such material, said apparatus comprising in combination:

a frame;

a conveyor system comprising an endless belt disposed along the frame and adapted to travel in a longitudinal direction;

feeding means situated at an upstream end of the conveyor system, and adapted to place sectional insulation lengths in an end-to-end, abutting relationship on the belt;

a planing means disposed above and secured to said frame downstream from said feeding means, said planing means adapted to establish a desired thickness in said length as the lengths move longitudinally along said frame;

a spraying system positioned along said frame above the belt, and adapted to apply an adhesive coating over the upper, exposed surface of said length of insulation material as they move downstream from said planing means;

a backing device situated downstream from said spraying system and in transversely movable relation to said frame, said backing device comprising a backing spool and a contact arm arranged to position backing from said spool onto the upper surface of said insulation sheet such that the combination backing material and abutting insulation sections form a continuous integral sheet; and grooving means slidably disposed in a lateral direction relative to said frame and beneath said belt, said grooving means adapted to form a series of lateral grooves or notches in the underside of said integral sheet as it progresses longitudinally down said frame, said means also adapted to cut the integral sheet into prescribed lengths.

2. The apparatus as defined in claim 1 which further includes a microprocessor assembly, said assembly adapted to control the movement of said material along said frame.

3. The apparatus as defined in claim 1 where the planing means comprises a band saw laterally situated across the track at a variable height.

4. The apparatus of claim 1 where the feeding means is adapted to adhere the ends of the sectional lengths of the material.

5. The apparatus as defined in claim 1 where the planing means includes automatic means to remove dust or trimmings from said assembly.

6. The apparatus as defined in claim 5 where said removal means comprises a conveyor and vacuum removal system.

7. The apparatus of claim 1 where the backing means includes an automatic means for ensuring an exact juxtapositon of the backing over the insulation sheet.

8. The apparatus as defined in claim 1 where the grooving means is comprised of:

a pair of arcuate tracks positioned beneath the belt in planes normal to the belt and transverse to a groove to be cut in the integral sheet, said tracks slidably ositioned relative to each other;

a separate saw fixedly mounted on each arcuate track to define a saw carriage, said saws inclined toward each other to cut a notch in said material.

9. A process for the fabrication of a grooved length of insulation material from sectional ungrooved lengths of said material, said process comprising:

positioning sectioned ungrooved lengths of a flat insulation material in an abutting relationship along a movable track conveyor, such that the material progresses downstream in a longitudinal direction along the conveyor;

reducing the thickness of the sectional ungrooved lengths;

preparing the upper surface of the sectional ungrooved lengths by automatically applying an adhesive solution to the upper surface of the sectional ungrooved lengths;

automatically affixing a continuous length of backing material to the prepared surface such as to form a continuous integrated length of the insulation materials from the sectional lengths;

forming a series of grooves or notches in the bottom of said material spaces along the integrated length where said spacing of the grooves or notches is determined by a microprocessor assembly; and severing the integrated length at selected intervals.

10. The method as described in claim 9 where the thickness of the sectional lengths is achieved by planing.

11. The method of claim 9 further including the step of gluing the ends of the lengths of material before reducing its thickness.

12. A method of increasing the flexibility of a length of inflexible, flat insulation which comprises:

conveying a length of inflexible, flat insulation along a linear path;

automatically applying backing to a first flat side of the length along a first portion of the linear path;

cutting a first V-shaped linear notch into the length from the opposite flat side of the length and entirely across the length without severing the backing; and cutting a second such notch into the length which is spaced from the first notch where the spacing between the first and the second notch is achieved automatically by a microprocessor assembly.

13. The method of claim 12 which further comprises planing the length prior to application of the backing to reduce the thickness of the length.

14. The method of making flexible flat insulation from lengths of inflexible flat insulation which comprises:

conveying at least two lengths of inflexible flat insulation in abutting end-to-end relation along a linear path;

planing the length of insulation to a desired thickness;

automatically applying backing to a first flat side of the lengths to hold the lengths together in said end-to-end relation;

cutting a separate first linear notch into each such length from the opposite side of the length and entirely across the length without severing the backing; and severing the length and the backing at intervals determined by a microprocessor assembly.

15. Apparatus for increasing the flexibility of a length of inflexible insulation, which comprises:

a conveyor to convey lengths of inflexible insulation along a linear path;

an application at a first position along the linear path to continuously and automatically apply a layer of backing to a first side of a first such length as such lengths progress along said path; and a notcher at a second position along the linear path adapted to receive the backed first length and form a first linear notch into the length from the opposite side of the first length and entirely across the length without severing the backing.

16. The apparatus of claim 15 wherein the nothcher comprises:

a first cutter movable across the first length and adapted to cut into the opposite side at a first acute angle relative to the opposite side; and a second cutter movable across the first length and adapted to cut into the opposite side at a second acute angle equal to the first acute angle to define said first linear notch between the two acute angles.

17. The apparatus of claim 16 wherein the two cutters are circular saws.

18. The apparatus of claim 16 where the cutters are moveably positioned relative to each other such that a notch of variable angulation may be achieved.

19. The apparatus of claim 15 which further comprises:

a planer assembly positioned on the linear path in advance of the notcher and adapted to receive and reduce the thickness of the first length.

20. The apparatus of claim 19 wherein the planer assembly comprises a band saw or reciprocating saw.

21. The apparatus of claim 20 wherein the planer assembly is adjustable to variably reduce the thickness of the first length.

22. The apparatus of claim 20 which further comprises an apparatus to remove trimmings and insulation dust from the assembly.

* * * * *

UNITED STATES PATENT AND TRADEMARK OFFICE
Certificate

Patent No. 4,838,968                                              Patented: June 13, 1989

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:
Charles M. Nelson, Donald Price and Frank Price.

Signed and Sealed this 14th Day of August 1990.

MICHAEL W. BALL

*Supervisory Patent Examiner*
*Art Unit 131*